(12) United States Patent
Brandsma et al.

(10) Patent No.: US 9,762,295 B2
(45) Date of Patent: Sep. 12, 2017

(54) SYSTEM AND METHOD FOR COMMISSIONING DEVICES

(71) Applicant: NX B.V., Eindhoven (NL)

(72) Inventors: Ewout Brandsma, Eindhoven (NL); Maarten Christiaan Pennings, Waalre (NL); Aly Aamer Syed, Deurne (NL); Timo van Roermund, Eindhoven (NL); Ruud Hendricksen, Beek en Donk (NL); Oswald Moonen, Eindhoven (NL)

(73) Assignee: NXP B.V., Eindhoven (NL)

( * ) Notice: Subject to any disclaimer, the term of this patent is extended or adjusted under 35 U.S.C. 154(b) by 624 days.

(21) Appl. No.: 13/622,936

(22) Filed: Sep. 19, 2012

(65) Prior Publication Data

US 2013/0076491 A1    Mar. 28, 2013

(30) Foreign Application Priority Data

Sep. 23, 2011    (EP) .................................... 11182503

(51) Int. Cl.
*H04Q 5/22*  (2006.01)
*H04B 5/00*  (2006.01)
*H04W 52/02*  (2009.01)

(52) U.S. Cl.
CPC ...... *H04B 5/0062* (2013.01); *H04W 52/0229* (2013.01); *Y02B 60/50* (2013.01)

(58) Field of Classification Search
CPC ............. G06K 7/10366; G06K 7/0008; G06K 7/10009; G06K 19/0723; G06K 7/1029;
(Continued)

(56) References Cited

U.S. PATENT DOCUMENTS 7,250,695 B2 *  7/2007  Connors et al. ............. 307/117
7,412,230 B2    8/2008  Kunkat et al.
(Continued)

FOREIGN PATENT DOCUMENTS

CN    101128839 A    2/2008
CN    102129596 A    7/2011
(Continued)

OTHER PUBLICATIONS

NFC Forum, "Connection Handover, Technical Specification", Version 1.2, 27 pgs (Jul. 7, 2010).
(Continued)

*Primary Examiner* — Kerri McNally
*Assistant Examiner* — Sharmin Akhter

(57) ABSTRACT

According to an aspect of the invention a system for commissioning devices is provided, which system comprises: a first device and a second device; an RFID tag comprised in the first device; a host processor comprised in the first device; wherein the second device is arranged to generate an electromagnetic field; wherein the RFID tag is arranged to detect the electromagnetic field and to wake up the host processor upon detecting said electromagnetic field in order for the second device to communicate with the host processor. Furthermore, a corresponding method for commissioning devices is provided. Since the RFID tag comprised in the first device is arranged to wake up the host processor, an end-user does not have to switch on the first device manually. Therefore, the user interaction is simplified. Furthermore, there is no need for a separate power button on the first device. The latter reduces cost and simplifies the design of the first device.

18 Claims, 7 Drawing Sheets

(58) Field of Classification Search
CPC ............ G08B 13/2434; G08B 13/2462; G08B 13/2417; G08B 13/246; G08B 13/2482; G08B 13/2448; G06Q 10/087; G06Q 20/352; G06Q 20/353; G06Q 40/02
USPC ................ 340/3.1, 5.6, 5.72, 10.1–10.6, 340/426.35–426.36, 538.11, 539.1, 340/572.1–572.9
See application file for complete search history.

(56) References Cited

U.S. PATENT DOCUMENTS

| | | | |
|---|---|---|---|
| 8,203,449 | B2 | 6/2012 | Park et al. |
| 2006/0258289 | A1* | 11/2006 | Dua ............................ 455/41.3 |
| 2007/0202807 | A1 | 8/2007 | Kim |
| 2008/0090520 | A1 | 4/2008 | Camp et al. |
| 2008/0143487 | A1* | 6/2008 | Hulvey ...................... 340/10.34 |
| 2009/0298555 | A1* | 12/2009 | Matson et al. ................. 455/574 |
| 2010/0231407 | A1* | 9/2010 | Carr ........................... 340/691.1 |
| 2010/0318693 | A1 | 12/2010 | Espig |
| 2011/0210831 | A1 | 9/2011 | Talty et al. |
| 2013/0002398 | A1* | 1/2013 | Brown et al. ................. 340/5.8 |
| 2013/0198813 | A1 | 8/2013 | van Roermund et al. |
| 2013/0211761 | A1 | 8/2013 | Brandsma et al. |
| 2014/0068089 | A1 | 3/2014 | Brandsma et al. |

FOREIGN PATENT DOCUMENTS

| | | |
|---|---|---|
| WO | 2006/054070 A1 | 5/2006 |
| WO | 2006/116168 A2 | 11/2006 |
| WO | 2007/076191 A2 | 7/2007 |
| WO | 2007/101080 A2 | 9/2007 |
| WO | 2009/044228 A2 | 4/2009 |
| WO | 2008/059460 A2 | 5/2009 |
| WO | 2008/059460 A3 | 5/2009 |
| WO | 2009/104131 A1 | 8/2009 |
| WO | 2009/128032 A1 | 10/2009 |
| WO | 2009/131381 A2 | 10/2009 |
| WO | 2010/032227 A1 | 3/2010 |
| WO | 2011/017007 A1 | 2/2011 |
| WO | 2011/035411 A1 | 3/2011 |
| WO | 2011/035412 A1 | 3/2011 |
| WO | 2011/035413 A1 | 3/2011 |
| WO | 2011/035414 A1 | 3/2011 |
| WO | 2011/097116 A2 | 8/2011 |
| WO | 2011/097116 A3 | 8/2011 |

OTHER PUBLICATIONS

Wi-Fi Alliance, "Wi-Fi Simple Configuration, Technical Specification", Version 2.0.2, 154 pgs (Dec. 2010).
"LPC1110/11/12/13/14/15 Product Data Sheet, Rev. 7.4", NXP, 110 pgs, retrieved from the internet at: http://www.nxp.com/documents/data_sheet/LPC111X.pdf (Jul. 30, 2012).
"Nokia 6212 Classic NFC Pairing with BH-505", NokiaManiacz, video from the Internet http://www.youtube.com/watch?v=pG60sBBArM4.
"Nokia Bluetooth Stereo Headset BH-505", Nokia, 14 pgs, retrieved from the internet at: http://nds1.nokia.com/files/support/apac/phones/guides/Nokia_BH-505_APAC_UG_en.pdf.
Extended European Search Report for European appln. No. 11182503.0 (Feb. 22, 2012).
Communication Pursuant to Article 94(3), in EP Appl. No. 11 182 503.0.

* cited by examiner

SYSTEM AND METHOD FOR COMMISSIONING DEVICES

CROSS-REFERENCE TO RELATED APPLICATIONS

This application claims the priority under 35 U.S.C. §119 of European patent application no. 11182503.0, filed on Sep. 23, 2011, the contents of which are incorporated by reference herein.

FIELD OF THE INVENTION

The invention relates to a system for commissioning devices. The invention also relates to a method for commissioning devices.

BACKGROUND OF THE INVENTION

Radio frequency identification technology (RFID) and, more specifically, near field communication technology (NFC), have proven to be of particular value for setting up Wi-Fi networks and for pairing Bluetooth devices. Furthermore, these technologies can be of high value in the field of smart buildings. For example, they can be used to simplify the commissioning of wireless devices in a smart building.

In this context, the term "commissioning" is used to refer to operations that relate to the configuration of devices, such as establishing a network connection between devices, establishing a control relationship between devices and localizing devices in an environment.

In a typical commissioning procedure two wireless devices are brought in close proximity of each other or in direct contact with each other. Subsequently, these devices establish a secure network connection and/or a control relationship between each other. Network parameters, including encryption keys, are exchanged over a very short distance which makes eavesdropping difficult. NFC technology, which typically requires distances of a few centimeters, provides a particular advantage in this respect. Another advantage of NFC technology is the so-called ease-of-install; NFC technology makes commissioning procedures easy and intuitive to perform and it reduces the error-proneness of these procedures.

As a result, the Wi-Fi Alliance (http://www.wi-fi.org/) has standardized NFC as optional means for Wi-Fi Simple Configuration (WSC), formerly known as Wi-Fi Protected Setup (WPS). This has been described in the document "Wi-Fi Simple Configuration, Technical Specification", version 2.0.0, December 2010 by the Wi-Fi Alliance.

In accordance with this known commissioning procedure an RFID tag is physically attached to the housing of a first wireless device. The RFID tag contains contact data of the first wireless device, such as its Media Access Control (MAC) address. In order to integrate the first wireless device into a Wi-Fi network, a second wireless device is equipped with an RFID reader unit. The second wireless device is brought into close proximity of the first wireless device in order to enable the RFID reader unit to read out the contact data of the first wireless device from the RFID tag. Then, the second wireless device may use the contact data in so-called in-band communication over the Wi-Fi network in order to integrate the first wireless device in a secure manner into the network.

In a similar way Bluetooth Easy Pairing enables establishing a secure Bluetooth connection between two devices, for example a phone and a headset. In this case not only a network connection is set up, but also a control relationship is established. For example, the audio stream from the phone may be routed to the headset and the headset may transmit commands back to the phone.

Both the Wi-Fi and the Bluetooth examples are based on RFID technology, in particular NFC technology. Specific details of the NFC communication involved have been described in the document "Connection Handover, Technical Specification" by the NFC Forum, version 1.2, July 2010 (http://www.nfc-forum.org/).

Another example of the use of RFID/NFC technology to establish a control relationship between devices is described in patent application WO 2010/032227 A1, filed by NXP Semiconductors and published on 25 Mar. 2010.

WO 2010/032227 A1 discloses a method for controlling controllable devices, such as lamp units that are installed in a building, with a plurality of control interface units, such as light switches. Each control interface unit has a receptor, such as a light switch, for receiving user actuations. Addresses to be used for selective transmission of messages to controllable devices are established by enabling the control interface unit that should control a controllable device to read a tag on or in the controllable device. The control interface units each have their own tag reader capable of reading the tag when the tag is in proximity of the control interface unit. The controllable devices are brought into the proximity of a selected one of the control interface units before installation of the controllable device, in order to indicate that the controllable device has to be controlled by actuation of a receptor of the selected one of the control interface units. The tag of the controllable device is read from the selected one of the control interface units. Information from the tag is automatically used to establish destinations to be used for messages from the selected one of the control interface units in response to future detection of user actuation of the receptor of the selected one of the control interface units. Subsequently, the controllable device may be installed in the building at a location outside said proximity.

Although these examples clearly show that RFID/NFC technology provides important advantages when it is used to commission wireless devices of the kind set forth, there are still a number of shortcomings which hinder large-scale deployment thereof. For example, a typical prior art procedure for connecting a Bluetooth headset with a Bluetooth-enabled mobile phone involves switching on the headset by pushing its power button and bringing it in close proximity of the phone. The procedure requires two end-user actions: (1) switching on the headset and (2) bringing the phone and the headset in close proximity of each other. It is essential that the headset is switched on before or while the phone is in close proximity of the headset; otherwise the procedure will fail. This procedure is not user-friendly and prone to errors. For instance, forgetting to switch on the headset before touching the phone is a mistake which is easily made. Therefore, a bad overall end-user experience may be the result. Furthermore, the headset needs to be equipped with a power button which increases its costs and limits the freedom to design it. It will be appreciated that the headset cannot stay powered all the time in view of the limited capacity of its battery, so it must be brought in a low-power or sleep mode when it is not in use.

A similar problem occurs when securely setting up a Wireless Sensor Network (WSN) comprising of wireless sensor nodes. Wireless sensor nodes are energy-frugal devices (having an average power consumption of less than 100 µW) that may extract the energy required for their operation from their environment. The extremely low average power consumption is achieved through duty cycling, i.e. the device wakes up, for example, every few minutes to perform some measurements and transmit a few tens of bytes and subsequently goes back to sleep. The total duration of the active period may be no more than a few milliseconds.

Wireless sensor nodes are able to configure themselves automatically in a WSN, but this procedure is not secure. For example, in home automation systems it is not possible to distinguish between sensor nodes belonging to one's own house and the neighbor's house. One would like to configure a network comprising the sensor nodes in one's own house, but not those in the neighboring houses. Furthermore, privacy and security present a problem. For example, one doesn't want one's presence to be inferred from wireless sensor messages, and one doesn't want someone to hack one's home automation system. Finally, although (unsecure) network joining may take place automatically, automation is less trivial for other aspects of commissioning such as establishing control relationships between devices and localization of devices.

Also in this case NFC-based "touching" enables easy and secure commissioning of a wireless sensor node. For example, an NFC-enabled installation device may be used to "touch" a sensor node which has an RFID tag attached to it in order to make it join the WSN in a secure manner, to establish a control relationship and/or to localize it. However, since the sensor node may only be in an active state once every few minutes it is necessary to explicitly force it to become active, for instance by pressing a button. Again, the button complicates the commissioning procedure and increases the cost of the sensor node. Furthermore, adding a button may be impractical in view of the small form factor of the sensor node. Also, the time span between a user pushing the button and subsequently bringing the installation device and the wireless sensor node in close proximity of each other (typically in the order of seconds) may already be too long considering the very limited energy resources of the wireless sensor node.

Therefore, there exists a need to simplify the procedures for commissioning devices of the kind set forth.

SUMMARY OF THE INVENTION

It is an object of the invention to simplify the procedures for commissioning devices of the kind set forth. This is achieved by a system as defined in claim 1 and by a method as defined in claim 9.

According to an aspect of the invention a system for commissioning devices is provided, which system comprises: a first device and a second device; an RFID tag comprised in the first device; a host processor comprised in the first device; wherein the second device is arranged to generate an electromagnetic field; wherein the RFID tag is arranged to detect the electromagnetic field and to wake up the host processor upon detecting said electromagnetic field in order for the second device to communicate with the host processor.

Since the RFID tag comprised in the first device is arranged to wake up the host processor, an end-user does not have to switch on the first device manually. Therefore, the user interaction is simplified. Furthermore, there is no need for a separate power button on the first device. The latter reduces cost and simplifies the design of the first device.

According to another aspect of the invention, the second device is arranged to read out configuration data comprised in the RFID tag and to use said configuration data to commission the first device.

According to a further aspect of the invention, the configuration data comprise contact data and the second device is arranged to use said contact data for establishing a network connection with the first device.

According to a further aspect of the invention, the host processor comprises an interface unit and the second device is arranged to establish the network connection with the first device via the interface unit.

According to a further aspect of the invention, the RFID tag comprises a tag controller which is arranged to send a wake-up signal to the host processor in order to wake up the host processor.

According to a further aspect of the invention, the tag controller is further arranged to send the wake-up signal only if data are read from and/or written to the tag memory or if data are read from and/or written to predetermined areas of the tag memory.

According to a further aspect of the invention, the first device is a Bluetooth headset and the second device is a Bluetooth-enabled mobile phone. An advantage of using the invention in combination with a known method of pairing Bluetooth devices, such as Bluetooth Easy Pairing, is that it is backward compatible. This means that a new headset can be manufactured without a power button and it still works seamlessly with any Bluetooth Easy Pairing enabled phone.

According to a further aspect of the invention, the network is a wireless sensor network, the first device is a wireless sensor node and the second device is arranged to commission the wireless sensor node.

According to an aspect of the invention, a method for commissioning a first device and a second device is provided, which method comprises that an RFID tag comprised in the first device wakes up a host processor comprised in the first device upon detecting an electromagnetic field generated by the second device, in order for the second device to communicate with the host processor.

According to another aspect of the invention, the second device reads out configuration data comprised in the RFID tag and uses said configuration data to commission the first device.

According to a further aspect of the invention, the configuration data comprise contact data and the second device uses said contact data for establishing a network connection with the first device.

According to a further aspect of the invention, the contact data comprise a Media Access Control (MAC) address and a public key.

According to a further aspect of the invention, the second device encrypts network parameters with the public key and subsequently sends the encrypted network parameters to the host processor utilizing the Media Access Control address, and the host processor receives the encrypted network parameters and subsequently decrypts the encrypted network parameters with a private key corresponding to the public key.

According to a further aspect of the invention, the host processor uses the decrypted network parameters for establishing the network connection.

According to a further aspect of the invention, subsequent to establishing the network connection, the first device sends a message to the second device for initiating a control relationship between the first device and the second device.

BRIEF DESCRIPTION OF THE DRAWINGS

The invention will be described in more detail with reference to the appended drawings, in which.

DESCRIPTION OF PREFERRED EMBODIMENTS

Figure 1:
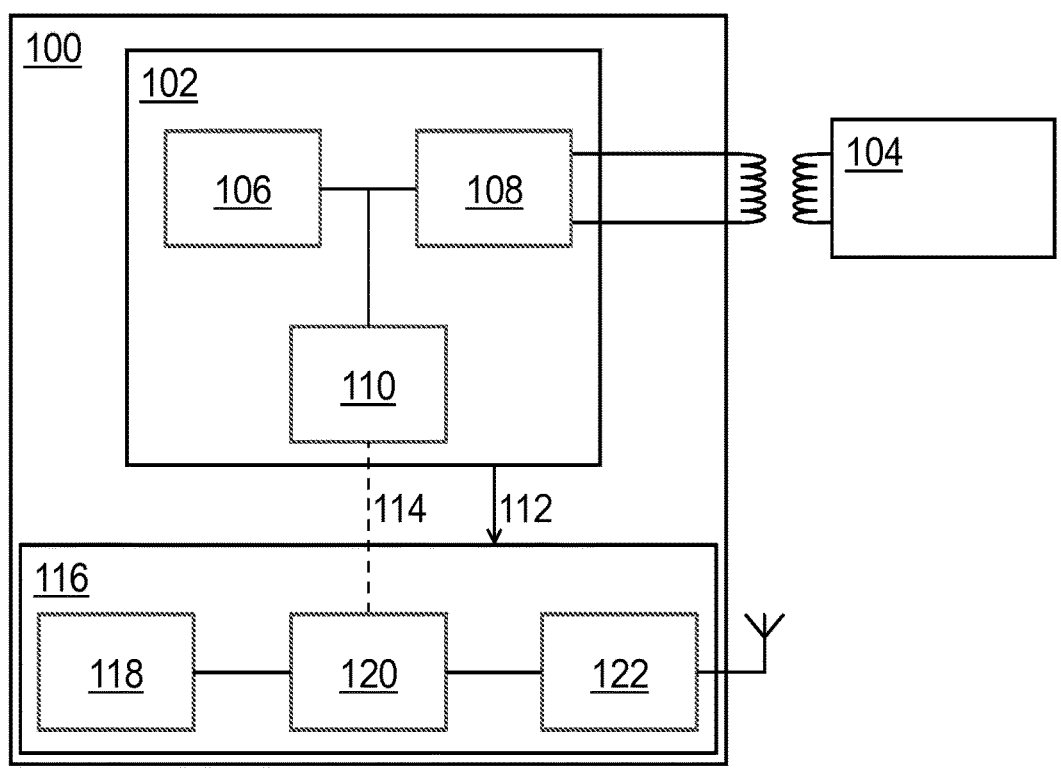
FIG. 1 shows a system diagram of an embodiment of the invention.

FIG. 1 shows a system diagram of an embodiment of the invention. The system comprises a first device 100 and a second device 104. The first device 100 comprises an RFID tag 102 and a host processor 116. The second device 104 comprises an RFID reader unit (not shown) which is arranged to read out data from the RFID tag 102 provided that the first device 100 is within the range of an electromagnetic field generated by the reader unit of the second device 104. The RFID tag 102 comprises a tag memory 106, an RFID interface 108 and a tag controller 110. The host processor 116 comprises a host memory 118, a host controller 120 and an interface unit 122.

In operation, the second device 104 interacts, via its RFID reader unit, with the RFID tag 102 of the first device 100. The second device 104 may for example read out data (such as a MAC address of the first device 100) from the tag memory 106. Alternatively the second device 104 may write data into the tag memory 106. When such an interaction takes place the RFID tag 102 activates and sends a wake-up signal 112 to wake up the host processor 116. The RFID tag 102 may be a passive tag, which means that it has no built-in power source. In that case, the RFID reader unit of the second device 104 wirelessly supplies operating power to the RFID tag through magnetic induction. Optionally, the tag controller 110 may have a data connection 114 with the host controller 120.

In an exemplary embodiment of the invention the first device 100 is a Bluetooth headset. The Bluetooth headset comprises headset speakers (not shown) and the interface unit 122 of the host processor 116 is a Bluetooth radio. In this exemplary embodiment the second device 104 is a mobile phone which is also equipped with a Bluetooth radio (not shown). In operation, the mobile phone reads out data from the RFID tag of the headset in order to establish a connection with the headset. After this network connection between the headset and the mobile phone has been established, a control relationship may also be established between them.

In another exemplary embodiment the first device 100 is a wireless sensor node and the interface unit 122 of the host processor 116 is an Ultra Low Power radio, for example an IEEE 802.15.4 radio. In this exemplary embodiment the second device is an NFC-enabled installation device which, again, may be a mobile phone, a personal digital assistant (PDA) or a portable computer. In operation, the installation device commissions the wireless sensor node by integrating it into a wireless sensor network.

The wake-up signal 112 is used to cause the host processor 116 of the first device 100 to move from an inactive state to an active state when the second device 104 interacts with the RFID tag 102 of the first device 100. The inactive state may be a low-power mode, a sleep mode or any other mode in which the power usage is significantly lower than in the active state.

Figure 2:
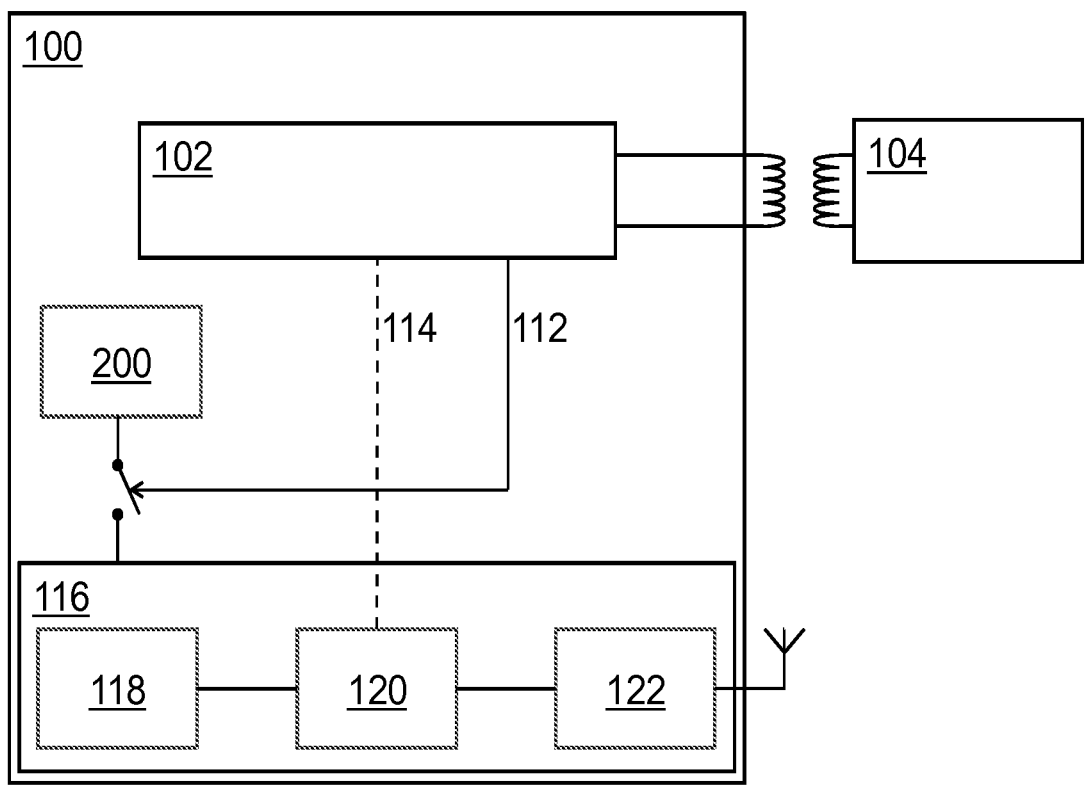
FIG. 2 shows a system diagram of another embodiment of the invention.

FIG. 2 shows a system diagram of another embodiment of the invention. In particular, it shows an example of a wake-up signal 112 which is used to wake up the host processor 116. In this example, the power supply of the host processor 116 is disabled in the inactive state and the wake-up signal 112 pulls a switch, for example a galvanic switch or a MOSFET switch, to connect a power source 200 to the host processor 116 such that the host processor 116 receives power and enters into the active state. In this way the power consumption in the inactive state is zero, but no data other than data in non-volatile memory of the host processor 116 can be retained and some start-up or boot time is required before the host processor 116 is fully operational.

Figure 3:
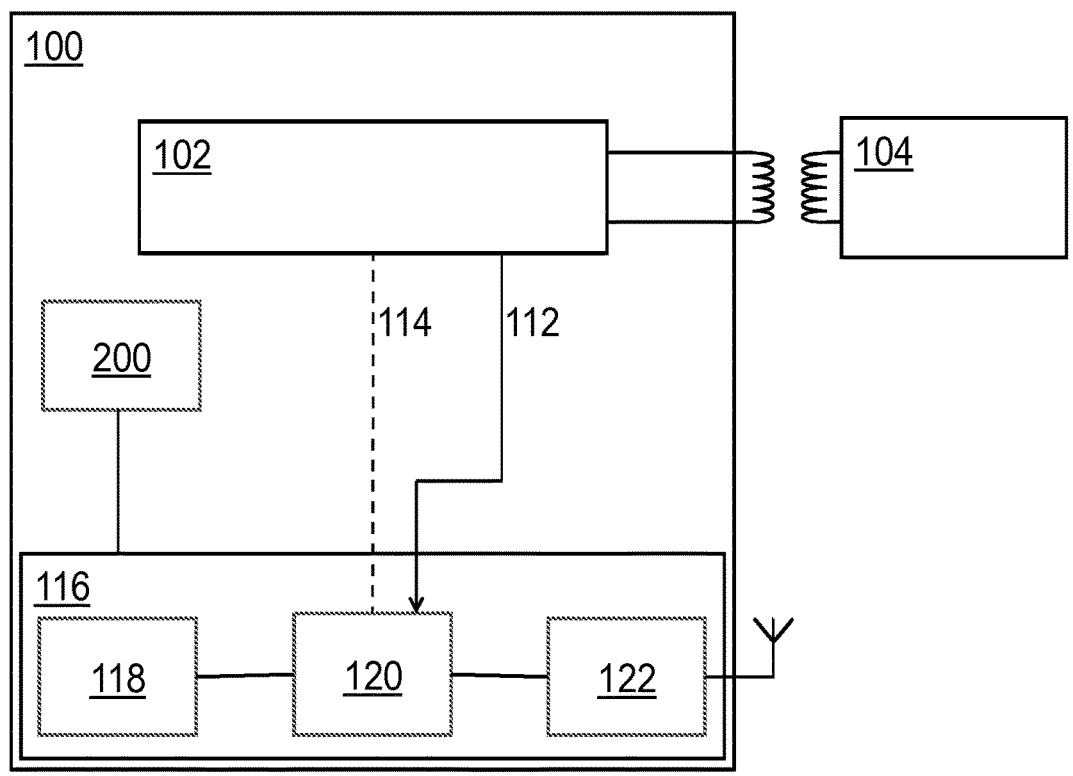
FIG. 3 shows a system diagram of a further embodiment of the invention.

FIG. 3 shows a system diagram of a further embodiment of the invention. In this alternative embodiment, the host processor 116 is capable of one or more low-power modes. As an example, NXP Semiconductors' product family LPC11xxL has a so-called Deep-Sleep and a Deep-Power-Down mode in which a current of 2 µA and 220 nA, respectively, is drawn from the power supply. The typical operating current in an active state is at least three orders of magnitude higher than that at a few mA. In this alternative embodiment the wake-up signal 112 is provided as a trigger signal on one of the pins, for example a PIO-pin or wake-up pin, of the host processor 116. When the host processor 116 receives the trigger signal on one of these pins it will move from a low-power mode to the active state. The selected power mode determines which internal blocks of the host processor 116 are switched off and which remain operational. Furthermore, the selected power mode determines the extent to which data can be retained in the host memory 118.

The embodiment of FIG. 3 is a refinement of the embodiment of FIG. 2 in the sense that it enables that different internal blocks of the host processor 116 can be switched off independently or switched to a mode with less functionality and less power consumption, whereas the embodiment of FIG. 2 merely enables to switch off the host processor 116 completely. In the embodiment of FIG. 3 additional logic (not shown) is available to wake up the internal blocks in the correct order when the wake-up signal 112 is received.

Figure 4:
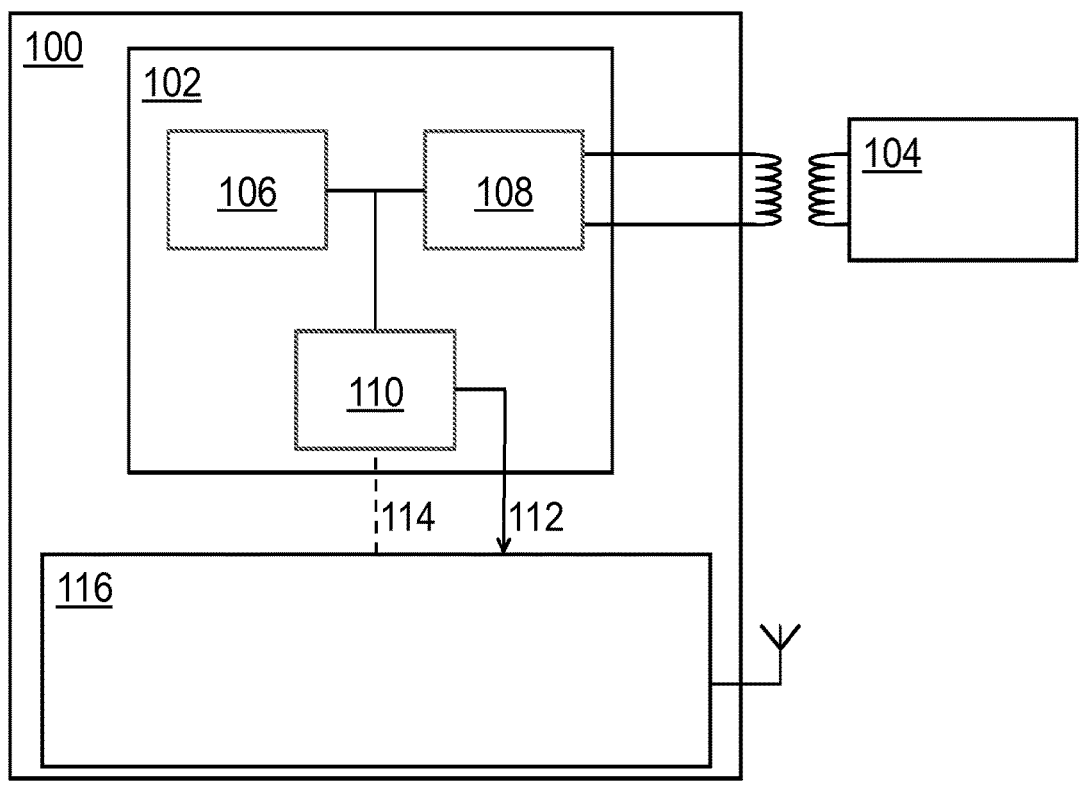
FIG. 4 shows a system diagram of a further embodiment of the invention.

FIG. 4 shows a system diagram of a further embodiment of the invention. In particular, it shows how a wake-up signal can be generated for waking up the host processor 116.

In a typical RFID system an RFID reader unit provides power to a passive RFID tag through inductive coupling. Data communication between the RFID reader unit and the RFID tag is established through load modulation. Typically, a protocol for address resolution is provided for selecting a particular RFID tag for further interaction in case multiple RFID tags are present in the electromagnetic field generated by the RFID reader unit. Furthermore, a typical interaction involves reading and/or writing data from/to a memory unit comprised in the RFID tag. The RFID tag usually comprises a tag controller, for example a microcontroller, which is arranged to control these operations.

According to an exemplary embodiment of the invention the tag controller 110 sends a wake-up signal 112 to the host processor 116 upon detecting an electromagnetic field generated by the second device 104. The tag controller 110 is able to detect the presence of an electromagnetic field via the RFID interface 108. Furthermore, the tag controller 110 also knows whether or not this presence is intentional, i.e. whether the RFID reader unit that generates the field has indeed selected the particular RFID tag for the communication. If the presence of a field is detected and the presence is intentional in the aforementioned meaning, then the tag controller 110 will send the wake-up signal 112 to the host processor 116.

Optionally, the tag controller 110 may be arranged to send the wake-up signal 112 only if data are read from and/or written to the tag memory 106, or, more specifically, only if data are read from and/or written to predetermined areas of the tag memory 106.

Furthermore, the conditions that determine whether or not a wake-up signal 112 is generated may be reconfigurable. Re-configurability can be achieved as follows. The second device 104 may write configuration parameters into a dedicated area of the tag memory 106. Alternatively, or additionally, re-configurability can be achieved by the host processor 116 writing configuration parameters into said dedicated area by means of the optional host connection 114. The tag controller 110 will interpret the configuration parameters to decide whether or not to trigger the wake-up signal 112.

Typically, a prior-art RFID tag is implemented as a single Integrated Circuit (IC) with no leads being connected to it other than the RFID antenna coil. In order to have the tag controller 110 provide a wake-up signal 112 a new IC needs to be designed and fabricated.

Figure 5:
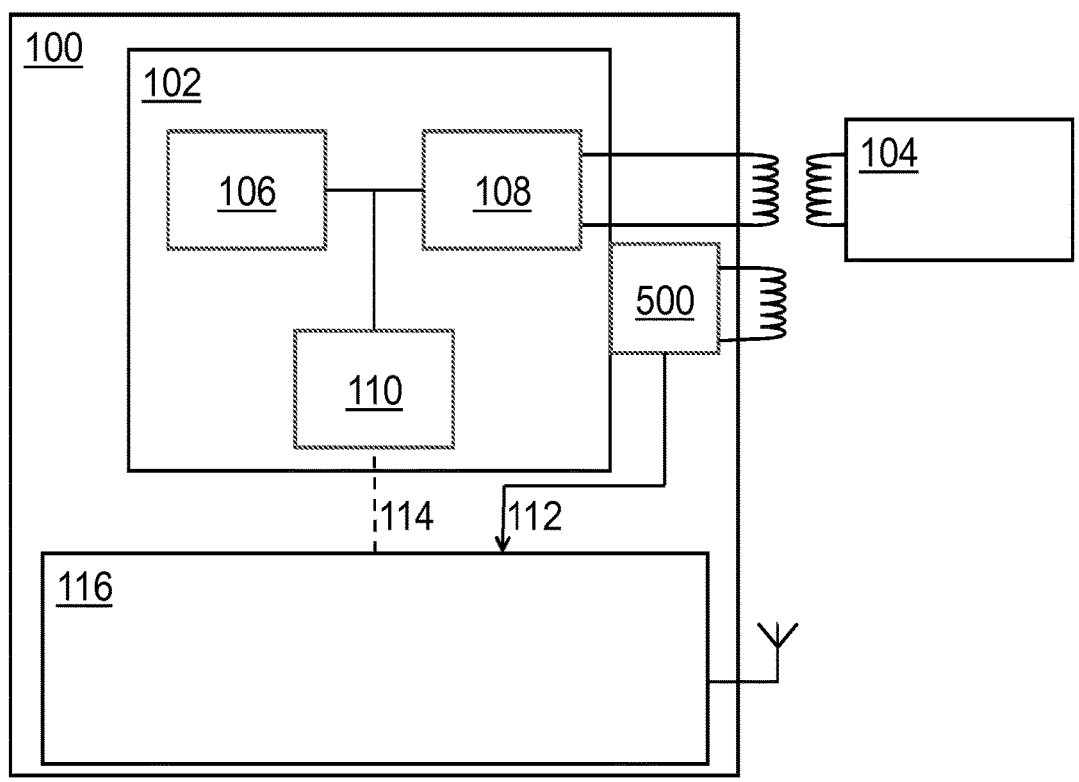
FIG. 5 shows a system diagram of a further embodiment of the invention.

However, instead of designing and fabricating an RFID tag IC capable of generating and sending a wake-up signal, a prior-art RFID tag IC can be used which is extended with a dedicated wake-up circuit. This is illustrated in FIG. 5, which shows a system diagram of yet a further embodiment of the invention. In this case, a dedicated wake-up circuit or field detector 500 must be added next to the prior art IC. In its most simple form this wake-up circuit 500 has its own antenna coil. Clearly, this antenna coil must be mounted in very close proximity to the RFID tag's antenna. Only then both antennas will be powered simultaneously when the second device 104 is in close proximity to them.

The skilled person will recognize that the wake-up signal 112 in this embodiment is only indicative of the presence of a field. It does not indicate whether a second device 104 actually interacts with the RFID tag 102, i.e. it does not indicate whether this particular RFID tag 102 is selected for communication by the second device 104. This means that the host processor 116 preferably will check whether an actual interaction has taken place with the RFID tag 102, e.g. by verifying whether a particular memory location has been written to, before e.g. proceeding with a certain commissioning operation such as establishing a network connection and/or establishing a control relationship.

Figure 6:
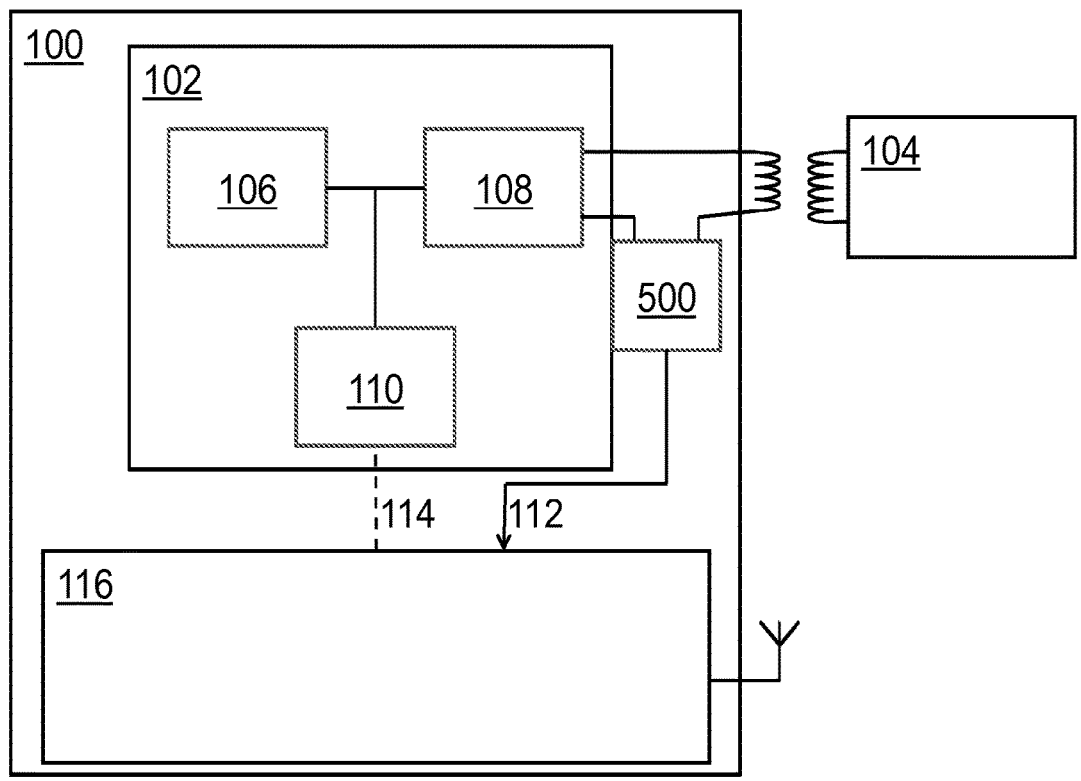
FIG. 6 shows a system diagram of a further embodiment of the invention.

FIG. 6 shows a system diagram of a further embodiment of the invention. In particular, it shows a refinement of the embodiment described with reference to FIG. 5. This embodiment also has a separate wake-up circuit 500, but in this case the wake-up circuit 500 shares an antenna coil with the RFID tag 102. This embodiment reduces cost and it makes sure that the RFID tag 102 and the wake-up circuit 500 both detect the same field.

Figure 7:
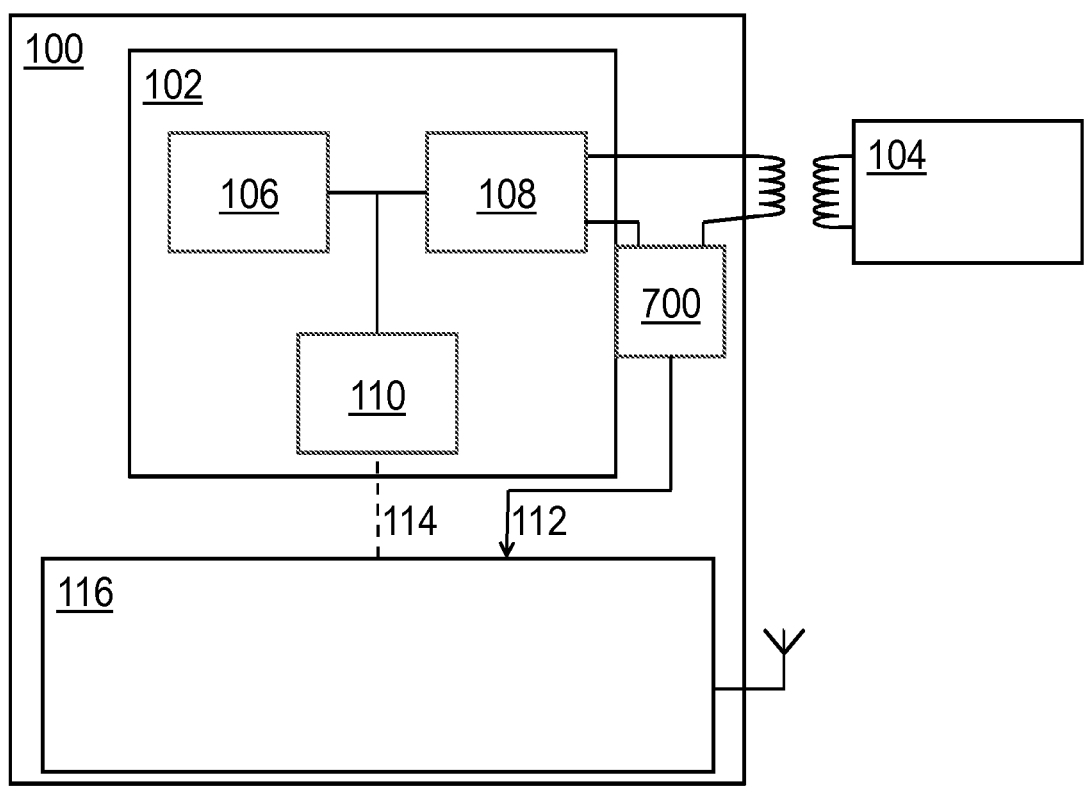
FIG. 7 shows a system diagram of a further embodiment of the invention.

FIG. 7 shows a system diagram of a further embodiment of the invention. In particular, it shows a further refinement of the embodiment described with reference to FIG. 6, and it involves further circuitry, i.e. a tag selection detector 700, capable of detecting whether the RFID tag 102 continues interacting for a longer period of time after an initial field is detected in its antenna coil. When an RFID reader creates a field multiple tags may respond. In a so-called anti-collision loop the reader will only select a single tag for further interactions. This selected tag will continue to (load) modulate the field, whereas the other tags will stop doing so. The tag selection detector 700 is arranged to detect whether such continued (load) modulation takes place in the antenna coil of the RFID tag 102 and only if this is the case it will send the wake-up signal 112 to the host processor 116.

The advantage of this further embodiment is that the host processor 116 will only be woken up if its RFID tag 102 is actually selected by the RFID reader unit and not just by the fact that a field is present in its coil. This avoids unnecessary wake-ups of the host processor 116 and therefore unnecessary power consumption by the host processor 116. Furthermore, the host processor 116 does not have to check whether an actual interaction has taken place with the RFID tag (as in the embodiment described with reference to FIG. 5). This means, for example, that it is not necessary for the RFID reader unit to write data to the RFID tag 102 only in order for the host processor 116 to know whether or not an actual interaction has taken place. Such additional writing of data is a drawback because it may break backward compatibility of a prior art commissioning procedure.

An important aspect of commissioning devices is establishing a network connection. The RFID tag 102 may be used to exchange configuration data such as contact data which enable the second device 104 to integrate the first device 100 into an existing network, for example, or to establish a network connection between the first device 100 and itself. Furthermore, commissioning may, for example, involve establishing a control relationship between the first device 100 and the second device 104. To this end, the RFID tag 102 may be used to exchange further configuration data. After waking up, the host processor 116 of the first device 100 will engage in out-of-band (i.e. RFID) communication and/or in-band (i.e. longer range like RF) communication with the second device 104.

An exemplary method of commissioning a first device 100 in accordance with the invention comprises the following steps. First, an end-user brings a second device 104 in close proximity of the (RFID tag 102 of the) first device 100 with the intent to integrate the first device 100 into a network administered by (or via) the second device 104. Note that in accordance with the invention the first device 100 does not have to be powered for this.

Second, the RFID reader unit of the second device 104 interacts with the first device 100 which results in two simultaneous actions: (1) the RFID tag 102 of the first device 100 raises the wake-up signal 112 according to the invention in order to wake up the host processor 116 of the first device 100, and subsequently the host processor 116 powers up its interface unit 122 and starts listening for a message; (2) the RFID reader unit of the second device 104 reads out certain contact data from the RFID tag 102 of the first device 100, for example a Media Access Control (MAC) address and a public key belonging to the first device 100. Subsequently, the second device 104 obtains network parameters belonging to the network to be joined, e.g. as stored in its internal memory. For example, a network ID (e.g. SSID for Wi-Fi network) and a network key (e.g. WPA2-key for a Wi-Fi network). Then, the second device 104 encrypts those network parameters with the public key belonging to the first device 100 and subsequently sends a message with this encrypted data over a radio interface unit addressed to the interface unit 122 of the first device 100 by utilizing the MAC-address of the first device 100.

Third, the first device 100 receives the message sent by the second device 104 and decrypts it with the private key corresponding to the public key, i.e. the private key of the public/private key pair. Then, the first device 100 utilizes the network parameters (network ID and network key) to connect to the network. This may involve further interactions over the (in-band) network and as a result the first device 100 may obtain a (dynamically assigned) network address.

Optionally, the first device 100 sends a message to the second device 104 in order to establish a control relationship with the second device 104. The dynamically assigned network address of the first device 100 may be part of this message. For example, if the first device 100 is a Bluetooth headset and the second device 104 is a mobile phone, the control relationship may involve streaming audio data. Alternatively, if the first device 100 is a wireless sensor node which measures a light level and the second device 104 is an installation device, the second device 104 may use the dynamic network address of the first device 100 in a subsequent step to associate it with a third device, for example a smart lamp that will control its light level based upon the light level measured by the wireless sensor node.

It must be emphasized that the implementation details are merely examples. The skilled person will appreciate that other network establishment protocols, other sets of network parameters, other mechanisms for secure in-band exchange of network keys, other networking technologies, and other types of devices may be used in a method according to the invention.

The above-mentioned preferred embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 first device
102 RFID tag
104 second device
106 tag memory
108 RFID interface
110 tag controller
112 wake-up signal
114 optional host connection
116 host processor
118 host memory
120 host controller
122 interface unit
200 power source
500 wake-up circuit
700 tag selection detector

The invention claimed is:

1. A system for commissioning devices, the system comprising:
a first device comprising an RFID tag and a host processor;
a second device; wherein the second device is configured to generate an electromagnetic field, the RFID tag is configured to detect the electromagnetic field and wake up the host processor upon detecting said electromagnetic field in order for the second device to communicate with the host processor, the RFID tag comprises a tag controller which is configured to send a wake-up signal to the host processor in order to wake up the host processor only when data are read from and/or written to a predetermined area of memory; and
a separate wake-up circuit comprising a tag selection detector capable of detecting whether the RFID tag continues interacting for a longer period of time after an initial field is detected in the antenna coil.

2. The system as claimed in claim 1, wherein the second device is configured to read out configuration data from the RFID tag and to use said configuration data to commission the first device.

3. The system as claimed in claim 2, wherein the configuration data comprise contact data and the second device is configured to use said contact data for establishing a network connection with the first device.

4. The system as claimed in claim 3, wherein the host processor comprises an interface unit and the second device is configured to establish the network connection with the first device via the interface unit.

5. The system as claimed in claim 1, wherein the first device is a Bluetooth™ headset and the second device is a Bluetooth-enabled mobile phone.

6. The system as claimed in claim 1, wherein the network is a wireless sensor network, the first device is a wireless sensor node, and the second device is configured to commission the wireless sensor node.

7. The system as claimed in claim 1, wherein conditions that determine whether or not a wake-up signal is generated are reconfigurable.

8. The system as claimed in claim 7, wherein the second device is configured to write configuration parameters into a dedicated area of the tag memory in order to reconfigure said conditions, and the host processor is configured to write configuration parameters into said dedicated area by means of a host connection in order to reconfigure said conditions.

9. The system as claimed in claim 1, wherein the second device writes configuration parameters into a dedicated area of the tag memory in order to reconfigure said conditions, and the host processor writes configuration parameters into said dedicated area by means of a host connection in order to reconfigure said conditions.

10. A method for commissioning a first device comprising an RFID tag and a host processor and a second device, the method comprising:
detecting, with the RFID tag, an electromagnetic field generated by the second device;
waking up the host processor upon detecting an electromagnetic field in order for the second device to communicate with the host processor;

sending, with a tag controller in the RFID tag, a wake-up signal to the host processor in order to wake up the host processor only when data are read from and/or written to predetermined areas of a tag memory; and detecting, with a tag selection detector, whether the RFID tag continues interacting for a longer period of time after an initial field is detected in the antenna coil.

11. The method as claimed in claim 10, further comprising:

reading, with the second device, configuration data comprised in the RFID tag; and using the configuration data to commission the first device.

12. The method as claimed in claim 11, wherein the configuration data comprise contact data and wherein the second device uses said contact data for establishing a network connection with the first device.

13. The method as claimed in claim 12, wherein the contact data comprise a Media Access Control (MAC) address and a public key.

14. The method as claimed in claim 13, further comprising:

encrypting, with the second device, network parameters with the public key; and sending the encrypted network parameters to the host processor utilizing the MAC address, wherein the host processor receives the encrypted network parameters and decrypts the network parameters with a private key corresponding to the public key.

15. The method as claimed in claim 14, wherein the host processor uses the decrypted network parameters for establishing the network connection.

16. The method as claimed in claim 11, wherein, subsequent to establishing the network connection, the first device sends a message to the second device for initiating a control relationship between the first device and the second device.

17. A system for commissioning devices, the system comprising:

a first device comprising an RFID tag and a host processor; and a second device, wherein the second device is configured to generate an electromagnetic field, the RFID tag is configured to detect the electromagnetic field, wake up the host processor upon detecting said electromagnetic field in order for the second device to communicate with the host processor, and detect said electromagnetic field and wake up the host processor by means of a separate wake-up circuit, wherein the separate wake-up circuit comprises a tag selection detector capable of detecting whether the RFID tag continues interacting for a longer period of time after an initial field is detected in the antenna coil.

18. The system as claimed in claim 17, wherein the separate wake-up circuit shares an antenna coil with the RFID tag.

* * * * *